Sept. 8, 1964 D. J. EVANS 3,147,612
CONSISTENCY MEASURING APPARATUS
Filed Sept. 14, 1962 2 Sheets-Sheet 1

Sept. 8, 1964   D. J. EVANS   3,147,612
CONSISTENCY MEASURING APPARATUS
Filed Sept. 14, 1962   2 Sheets-Sheet 2

INVENTOR.
DANIEL J. EVANS
BY
ATTORNEYS

United States Patent Office 3,147,612
Patented Sept. 8, 1964

3,147,612
CONSISTENCY MEASURING APPARATUS
Daniel J. Evans, Feasterville, Pa., assignor to Fischer & Porter Company, Warminster, Pa., a corporation of Pennsylvania
Filed Sept. 14, 1962, Ser. No. 223,648
5 Claims. (Cl. 73—53)

This invention relates to consistency measuring apparatus designed to measure the consistency of slurries such as paper stock. While the apparatus is more widely applicable, it is of major significance in the measurement of paper stock, and for uniformity the description of the invention will be primarily directed to this use. The term "consistency" is herein used in its conventional sense in the paper making art, being the percentage of insoluble solids by weight in a suspension or slurry.

In the patent of Victor P. Head No. 3,027,756, dated April 3, 1962, there is disclosed a device for measuring the consistency of a suspension constituting what may be referred to as a non-viscous plastic, by which is meant a material in which the increase of shear stress with shear rate is a negligible fraction of the yield-stress value. Such a suspension is typified by a slurry of fibrous vegetable material suspended in water containing a negligible amount of dissolved solids, "negligible" being used from the standpoint of affecting viscosity, in the usual sense, of the aqueous carrier. Paper stock and unsweetened food pulps fall in this category. In such instances the value of the yield stress represents, substantially, the upper limit of the stress possible in the slurry, and any attempt to increase the stress merely results in increase of velocity of flow, without substantial increase of stress. The yield stress is then essentially a measure of consistency, the measurement being substantially insensitive to changes of temperature, freeness of the slurry, and large variations in flow rates. For the determination of the yield stress the apparatus of said patent comprises a float consisting of a rod from which fingers project laterally to effect shearing of the suspension, the float exerting a force on a transmitter which provides an output, for example, pneumatic, to serve for measurement or control.

In the apparatus shown in the Head patent, involving pneumatic transmission, a float acts on a diaphragm to provide the response to shearing force. The float is accordingly required to be movable and the apparatus is subject to possible damage by impact of solid bodies which may be carried by the flowing stream. The aspect of the float presented to the stream is also subject to some variation. Further, the assembly shown in said patent is not readily cleanable.

In accordance with the present invention, the responsive element, having one or more fingers and corresponding to the float of said patent, is, so far as presentation to the flowing liquid is concerned, substantially rigidly fixed in position so as always to present the same aspect to the liquid. However, it is cushioned against shock by a resilient mounting. But even though the mounting is resilient its movements are very slight. The desired situation is achieved through the measurement of minute deflections by means of a strain gauge assembly.

The use of a strain gauge assembly, however, presents substantial difficulty because of the high sensitivity of strain gauges to temperature variations. The sensing finger or fingers must be of substantial external dimensions, and since temperatures of the flowing stream may vary rather quickly, it will be evident that a change of temperature would ordinarily be accomplished by a period of thermal change producing a background disturbance of the measurements obliterating small changes in consistency. Strain gauges have commonly involved compensation for temperature changes; but the compensation is a matter of substantial difficulty and in any event, as usually carried out, is to take care of changes of temperature which are uniform throughout the element, the strains of which are undergoing measurement. This would not be true in the consistency measuring apparatus to which this invention pertains: in this case the application of temperature is not symmetrical and, for example, if the flowing slurry increased in temperature, the upstream side of the detecting element would be heated more rapidly than the downstream side.

In accordance with the present invention there is adopted a novel arrangement which, basically, involves maintenance of an isothermal condition of the multiple strain gauge elements which are involved. In brief, this is achieved by associating them with a fairly heavy body of a material such as copper which has very high thermal conductivity. Adopting this results in the provision of a consistency measuring apparatus of remarkable sensitivity without any necessity for providing compensation.

The broad objects of the present invention relate to the attainment of the foregoing advantages, and these and other objects relating to details of construction will become apparent from the following description, read in conjunction with the accompanying drawing, in which.

Figure 1:
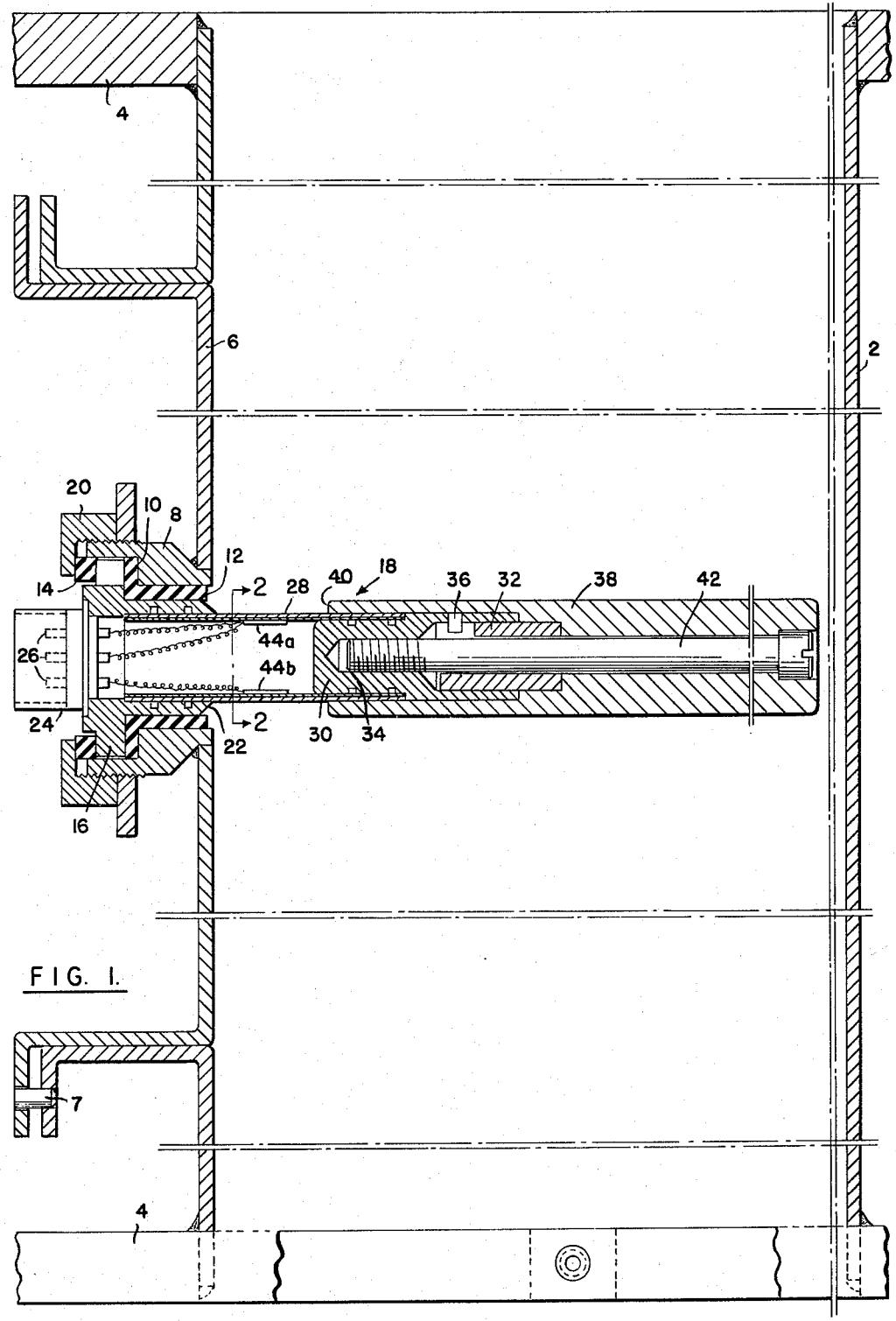
FIGURE 1 is a vertical section through a preferred form of the apparatus.

Referring first to FIGURE 1, there is indicated at 2 a short pipe section provided with flanges 4 which may be bolted to other parts of a liquid conduit through which flow of a slurry to be measured is taking place. It may be assumed for purposes of consistent description that flow is taking place upwardly, though, considering the nature of the apparatus, this is quite immaterial, the apparatus being essentially insensitive to the direction of flow with respect to gravity, there being required only a slight shift of zero of the apparatus to compensate for the orientation of the flow. A window in the member 2 is closed by a removable insert 6 which supports the sensing apparatus and may be taken out for purposes of inspection or cleaning. Orientation of this is accomplished by the provision of an aligning pin 7, the insert 6 being clamped in place in any desired fashion.

The insert 6 has a central opening about which is welded the coupling element 8 provided with a shoulder 10 against which the sensing assembly 18 is clamped by the location of a flange 16 thereof between annular resilient elements 12 and 14, for example, of silicone rubber, clamping being effected by a nut 20 threaded on the exterior of the element 8. The base of the assembly 18 is indicated at 22 and has the flange 16 already mentioned. Secured hermetically to this by soldering is the electrical connector element 24 of conventional type which is provided with electrically conducting pins 26 receivable in a mating element connected to a cable. The pins are electrically connected by conductors to the strain gauge elements. Soldered or otherwise secured hermetically in the base 22 is a tube generally indicated at 28, the construction of this being hereafter described in greater detail. This in turn is closed by a plug 30, also hermetically sealed to the tube, provided with a tapped opening 34 and with a socket 32 for the reception of the central portion of a finger element 38. This finger element is shown in FIGURE 1 as a simple cylinder, but to provide orientation for a multiple assembly of finger elements the sockets 32 is provided with an inwardly extending aligning pin 36 receivable in an axially extending slot in the central element of the finger. A bolt 42 serves to secure the finger to the plug 30, being threaded into the tapped opening 34. The finger 38 overlaps the tube 28 as indicated, terminating at 40. The diameter of the finger 38 is chosen so as to be suitable for the particular slurry undergoing measurement, and for this purpose must have a proper diameter. The portion overlapping the tube 28 may have small clearance therewith but clearance should be provided so that the application of transverse force to the tube 28 is at its outer end.

Figure 2:
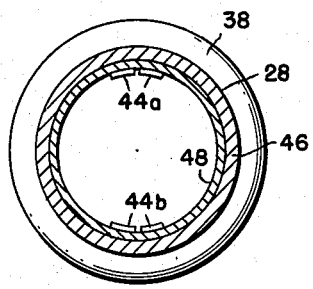
FIGURE 2 is a vertical fragmentary section taken on the plane indicated at 2—2 in FIGURE 1, the radial dimensions of the parts being exaggerated for purpose of clarity of disclosure.

FIGURE 2 shows the construction of the tube 28. Desirably all parts of the sensing assembly exposed to the slurry are of stainless steel. Accordingly, the tube 28 consists of an outer cylinder 46 of stainless steel which is clad inwardly with a copper cylinder 48. For purposes of the present invention the copper cylinder should be bound immovably to the stainless steel outer cylinder, and for this purpose it is desirable either to shrink the stainless steel tube on the copper tube or secure it therein by so-called atomic bonding. The two tubes are so intimately united that they function as a single unit from the mechanical standpoint.

Bonded interiorly, in conventional fashion, to the copper tube are the four strain gauge elements indicated at 44a and 44b. Consistent with upward flow, the upwardly applied force to the finger 38 will, if increased, apply to the strain gauge elements 44b a tension increment, and to strain gauge elements 44a a compression increment. The ratio of thermal conductivities of copper to stainless steel is approximately 30:1. This ratio is so high that a great increase of thermal conductivity is achieved by a cross-section of copper even substantially less than that of the stainless steel. In a typical arrangement which has been found highly satisfactory, the stainless steel tube 46 has a wall thickness of 0.025 inch and the copper tube 48 had a wall thickness of 0.010 inch. Even though the stainless steel wall thickness was thus approximately 2.5 times that of the copper, the copper was largely responsible for the substantially isothermal condition of the wall to which the strain gauge elements were secured. While greater thermal conductivity could be secured by a heavier wall thickness of the copper tube, the thickness of the copper is limited by the fact that under the stresses encountered it should not exceed its elastic limit; in other words there should be no hysteresis in its elastic response.

The copper inner tube not only presents a substantially isothermal condition to the strain gauge element but also, by its intimate contact with the stainless steel, practically enforces an isothermal condition of the stainless steel tube itself. An increment of temperature, for example, applied to the lower side of the stainless steel tube would be only slowly transferred to the upper side through this tube; but because of the thin wall of the stainless steel tube, the heat is rapidly transferred to the copper and then through the copper to other portions of the stainless steel tube. This very satisfactorily prevents stresses due to temperature gradient in the stainless steel tube.

Silver, or preferably a silver alloy having substantial stiffness may be used instead of copper as the material for the inner tube. Or there may be used another metal or alloy having high thermal conductivity.

Figure 3:
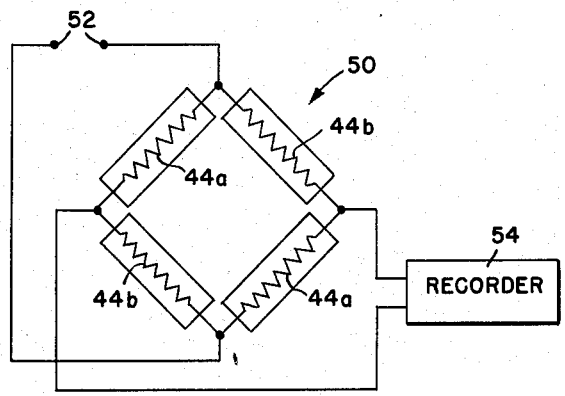
FIGURE 3 is a schematic diagram of the electrical elements involved.

The electrical system of the apparatus is illustrated in FIGURE 3. The strain gauges are disposed in a bridge 50 as indicated, the companion elements 44a being in opposite arms, and the companion elements 44b also in opposite arms. The bridge is desirably energized by alternating current at commercial frequency through terminals 52, and its output is delivered to a receiver 54 which may be of any conventional type such as commonly used in connection with these bridges. The receiver 54 may be of indicating or recording type depending upon whether spot measurements or continuous measurements are desired. It is shown as a recorder. Since the receiver may be conventional it need not be described in detail, but it may be of the highly sensitive type capable of measuring very small signals such as illustrated in the application of Roy F. Schmoock, Serial No. 189,837, filed April 24, 1962.

Figure 4:
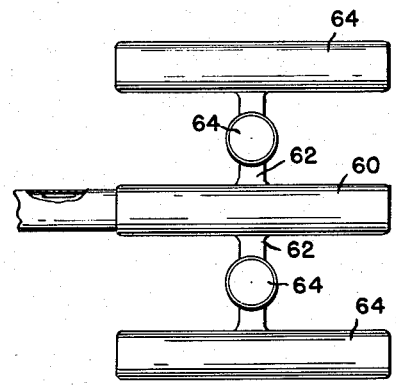
FIGURE 4 is a diagrammatic elevation showing an alternative form of the sensing element.

If the consistency of the slurry is high, a single finger such as 38 may be used; but for lower consistencies it is desirable to use a detector comprising a number of fingers. This arrangement is illustrated in FIGURE 4 in which the element 60 corresponds to the finger 38 and is provided with extension rods 62 carrying additional fingers 64 which are desirably mounted so that adjacent fingers are displaced (for example at 90°) relative to each other.

With the arrangement described, useful signals may be obtained of the order of the thermal error signals of an ordinary arrangement of a strain gauge assembly. A sensitivity has been obtained making measurements possible to 0.01 pound of total force. A typical range of usefulness would be from 0.1 pound to 30 pounds.

Strain gauge elements of various types may be used, but the wire type is preferred because of its lower sensitivity to temperature variations than the known semiconductor types. These latter have a greater sensitivity to strain, but they are also more sensitive to temperature variations. They may, of course, be used, in appropriate circuitry, if the use does not involve contemplated large temperature variations.

It will be evident that various departures from what has been specifically described may be made without deviating from the basic aspects of the invention as defined in the following claims.

What is claimed is:

1. Consistency measuring apparatus comprising:
a conduit for flowing slurry; and
a shearing member secured in said conduit,
said shearing member comprising a tube, means closing the ends of said tube to provide a sealed chamber, and strain gauge elements secured to the inner wall of said tube within said chamber,
said tube comprising concentric mutually bonded cylinders with the outer cylinder formed of a metal which is a relatively poor conductor of heat and with the inner cylinder formed of a metal which is a relatively good conductor of heat to provide a substantially isothermal condition at the locations of the strain gauge elements, said tube being secured to said conduit at one end thereof, thereby providing a cantilever arranged to be flexed in accordance with the consistency of a flowing slurry.

2. Consistency measuring apparatus comprising:
a conduit for flowing slurry; and
a shearing member secured in said conduit,
said shearing member comprising a tube, means closing the ends of said tube to provide a sealed chamber, and strain gauge elements secured to the inner wall of said tube within said chamber,
said tube comprising concentric mutually bonded cylinders with the outer cylinder formed of stainless steel and with the inner cylinder formed of a metal which is a relatively good conductor of heat to provide a substantially isothermal condition at the locations of the strain gauge elements, said tube being secured to said conduit at one end thereof, thereby providing a cantilever arranged to be flexed in accordance with the consistency of a flowing slurry.

3. Consistency measuring apparatus comprising:
a conduit for flowing slurry; and
a shearing member secured in said conduit,
said shearing member comprising a tube, means closing the ends of said tube to provide a sealed chamber, and strain gauge elements secured to the inner wall of said tube within said chamber, said tube comprising concentric mutually bonded cylinders with the outer cylinder formed of a metal which is a relatively poor conductor of heat and with the inner cylinder formed of copper to provide a substantially isothermal condition at the locations of the strain gauge elements, said tube being secured to said conduit at one end thereof, thereby providing a cantilever arranged to be flexed in accordance with the consistency of a flowing slurry.

4. Consistency measuring apparatus comprising:
a conduit for flowing slurry; and
a shearing member secured in said conduit, said shearing member comprising a tube, means closing the ends of said tube to provide a sealed chamber, and strain gauge elements secured to the inner wall of said tube within said chamber, said tube comprising concentric mutually bonded cylinders with the outer cylinder formed of stainless steel and with the inner cylinder formed of copper to provide a substantially isothermal condition at the locations of the strain gauge elements, said tube being secured to said conduit at one end thereof, thereby providing a cantilever arranged to be flexed in accordance with the consistency of a flowing slurry.

5. Consistency measuring apparatus comprising:
a conduit for flowing slurry; and
a shearing member resiliently secured in said conduit, said shearing member comprising a tube, means closing the ends of said tube to provide a sealed chamber, and strain gauge elements secured to the inner wall of said tube within said chamber, said tube comprising concentric mutually bonded cylinders with the outer cylinder formed of a metal which is a relatively poor conductor of heat and with the inner cylinder formed of a metal which is a relatively good conductor of heat to provide a substantially isothermal condition at the locations of the strain gauge elements, said tube being secured to said conduit at one end thereof, thereby providing a cantilever arranged to be flexed in accordance with the consistency of a flowing slurry.

References Cited in the file of this patent

UNITED STATES PATENTS

| | | |
|---|---|---|
| 2,159,082 | Hartley | May 23, 1939 |
| 2,826,914 | Reiley | Mar. 18, 1958 |
| 3,098,384 | Nusbaum | July 23, 1963 |
| 3,115,777 | Hochbreiter | Dec. 31, 1963 |